US012595840B2

(12) United States Patent
Skardelly et al.

(10) Patent No.: US 12,595,840 B2
(45) Date of Patent: Apr. 7, 2026

(54) TRANSMISSION FOR A COAXIAL TWO-MACHINE ELECTRIC DRIVE OF A MOTOR VEHICLE

(71) Applicant: Bayerische Motoren Werke Aktiengesellschaft, Munich (DE)

(72) Inventors: Thomas Skardelly, Ismaning (DE); Dominik Suckart, Erding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 38 days.

(21) Appl. No.: 18/418,988

(22) Filed: Jan. 22, 2024

(65) Prior Publication Data

US 2024/0247703 A1 Jul. 25, 2024

(30) Foreign Application Priority Data

Jan. 23, 2023 (DE) ...................... 10 2023 101 506.0

(51) Int. Cl.
*F16H 57/00* (2012.01)
*F16H 57/02* (2012.01)

(52) U.S. Cl.
CPC ..................... *F16H 57/0031* (2013.01); *F16H 2057/02034* (2013.01)

(58) Field of Classification Search
CPC ............. F16H 1/22; F16H 2057/02034; F16H 2057/02043; F16H 57/0031; F16H 57/0037; B60K 1/02; B60K 17/12; B60K 17/145
See application file for complete search history.

(56) References Cited

U.S. PATENT DOCUMENTS

| | | | |
|---|---|---|---|
| 8,336,655 B2 * | 12/2012 | Knoblauch | .......... B60K 7/0007 477/3 |
| 10,207,572 B2 | 2/2019 | Makino et al. | |
| 10,259,318 B2 * | 4/2019 | Frohnmayer | ............ B60K 1/02 |
| 10,895,320 B2 * | 1/2021 | Suyama | .................. F16H 48/10 |
| 11,192,434 B2 * | 12/2021 | Hummel | ............... B60K 17/02 |
| 11,865,908 B2 * | 1/2024 | Lutz | ...................... B60K 1/02 |
| 12,194,840 B2 * | 1/2025 | Ye | ........................... B60K 17/04 |

(Continued)

FOREIGN PATENT DOCUMENTS

| | | | |
|---|---|---|---|
| DE | 10 2020 113 192 B4 | 12/2021 | |
| DE | 102022118690 A1 * | 2/2024 | ............. F16H 48/36 |

(Continued)

OTHER PUBLICATIONS

German-language Search Report issued in German Application No. 10 2023 101 506.0 dated Sep. 26, 2023, with partial English translation (11 pages).

*Primary Examiner* — Bobby Rushing, Jr.
(74) *Attorney, Agent, or Firm* — Crowell & Moring LLP

(57) ABSTRACT

A transmission for transmitting torque from two coaxially arranged electric drive machines to two wheels of a drive axle of a motor vehicle, wherein each of the drive machines is connected to a wheel of the drive axle via a speed-reduction sub-transmission for transmitting torque. The sub-transmissions have coaxial drive shafts, coaxial intermediate shafts and coaxial outputs shafts, wherein, on both sub-transmissions, a first spur-gear-toothing stage of the drive shaft with the intermediate shaft is arranged closer to the assigned electric drive machine than a second spur-gear-toothing stage of the intermediate shaft with the output shaft.

11 Claims, 7 Drawing Sheets

(56) References Cited

U.S. PATENT DOCUMENTS

| | | | | |
|---|---|---|---|---|
| 2014/0371016 A1 * | 12/2014 | Knoblauch | .............. | B60K 1/02 |
| | | | | 475/5 |
| 2018/0118023 A1 * | 5/2018 | Makino | ................... | F16H 57/04 |
| 2021/0381587 A1 * | 12/2021 | Williams | ............. | B60K 17/043 |

FOREIGN PATENT DOCUMENTS

| | | | | | | |
|---|---|---|---|---|---|---|
| EP | 4091851 A1 | * | 11/2022 | .............. | B60K 1/02 |
| JP | 3678904 B2 | * | 8/2005 | .............. | B60L 15/20 |
| WO | WO-2021005175 A1 | * | 1/2021 | .............. | B60K 1/02 |

* cited by examiner 12    13    14    15    16    17    13´    12´

TRANSMISSION FOR A COAXIAL TWO-MACHINE ELECTRIC DRIVE OF A MOTOR VEHICLE

This application claims priority under 35 U.S.C. § 119 from German Patent Application No. 10 2023 101 506.0, filed Jan. 23, 2023, the entire disclosure of which is herein expressly incorporated by reference.

BACKGROUND AND SUMMARY

This disclosure relates to a transmission for transmitting torque from two electric drive machines to two wheels of a drive axle of a motor vehicle.

For motor vehicles driven by electric drive machines, a known drive topology is characterized by the two wheels of a drive axle being driven by in each case one electric drive machine. It is then not necessary for any mechanical differential to be installed since the wheels can be driven independently of one another.

Owing to the typical installation-space conditions in motor vehicles, it is often not possible for the electric drive machines to be arranged directly on the wheel hub in each case. The motors are thus often installed centrally in relation to a vehicle transverse direction. The transmission of torque from the respective electric drive machine to the associated driven wheel then occurs via in each case one transmission.

The two transmissions are conventionally of symmetrical construction, so that the two rotor shafts are arranged coaxially; the two output shafts, and intermediate shafts possibly also present, are then also arranged coaxially. In order to save installation space, weight and costs, the two transmissions may be arranged abutting against one another in such a way that they are supported on one another. The mounting of the shafts of the transmissions is in this way simplified significantly.

In case the two transmissions are connected to one another, it is then also the case that the two outputs together may be referred to as an output, whereas the transmission parts for each of the two outputs are then referred to as a sub-transmission of the transmission in each case.

For compensation of axially acting forces through mutual support, the shafts of the sub-transmissions normally have axial bearings. Due to the large thrust torques and traction torques that occur, in particular at the rear axle, the axial bearings have to be adequately dimensioned. However, the installation space, specifically at the output shafts, is very limited.

Document DE 10 2020 113 192 B4 has disclosed a transmission in which a second drive shaft has a first connecting piece which engages into a first cavity of the first drive shaft and which is arranged coaxially with respect to the second drive shaft. In this transmission, a first axial bearing may be arranged centrally between the first drive shaft and the second drive shaft in relation to an axial direction of the drive shafts, wherein the first axial bearing is preferably a needle bearing.

Against this background, it is an object of the present disclosure to improve a transmission for transmitting torque from two electric drive machines to two wheels of a drive axle of a motor vehicle, in particular to reduce its width, for example in relation to a vehicle transverse direction.

Disclosed according to one aspect is a transmission for transmitting torque from two coaxially arranged electric drive machines to two wheels of a drive axle of a motor vehicle, wherein each of the drive machines is connected to a different one of the wheels of the drive axle by means of a different speed-reduction sub-transmission for transmitting torque, and wherein the sub-transmissions have coaxial drive shafts, coaxial intermediate shafts, and coaxial outputs shafts.

In relation to an axis of rotation of the two electric drive machines, on both sub-transmissions, a first spur-gear-toothing stage of the drive shaft with the intermediate shaft is arranged closer to the assigned electric drive machine than a second spur-gear-toothing stage of the intermediate shaft with the output shaft.

With a speed-reduction transmission, this means that the larger toothed gearwheel of the first spur-gear-toothing stage is arranged on the intermediate shaft axially at the outside. This in turn makes possible, in particular in the case of an axially externally recessed toothed-gearwheel rim, an arrangement of a main bearing of the intermediate shaft radially within the toothed ring of the intermediate-shaft toothed gearwheel of the first spur-gear-toothing stage and axially in the region of the toothed ring. Consequently, in comparison with known solutions, the axial installation space requirement for the main bearing of the intermediate shaft is obviated.

In relation to the transmission as a whole, an axial installation space requirement for two main bearings is thus obviated if the disclosed implementation is realized at both intermediate shafts. This saving in terms of installation space is applicable in a substantially 1-to-1 manner in relation to a required installation space of a drive unit made up of the electric drive machines and the transmission arranged therebetween. In this way, a significantly greater amount of available installation space for the drive kinematics and the wheels remains.

According to one embodiment, a main bearing, in particular an axial rolling bearing, of the intermediate shaft is configured to be radially within and axially in the region of the first spur-gear-toothing stage. In this way, the advantage in terms of installation space of the disclosure can be realized.

The disclosure is based inter alia on the consideration that, in the case of electromotively driven motor vehicles with wheel-selective driving of two wheels of an axle (so-called "double electric machine concepts"), the transmission is seated with two one- or two-stage spur-gear sets (alternatively planetary-gear set+spur-gear set) for each machine-wheel drive between the two electric machines (so-called "T-topology"). The focus—in particular with the transmission—is in this case as compact an installation space requirement as possible (in particular with regard to width, that is to say the dimension in the vehicle transverse direction), high efficiency and low weight.

T-topologies for wheel-selective drives are used in various current electromotively driven motor vehicles or are under development.

In the case of the prior-art solutions, the two transmission halves are designed as separate units. In this respect, each transmission half has in each case a separate rolling-bearing arrangement and possibly separate housing halves. This results in a high installation space requirement (width/weight) and a large number of rolling bearings (efficiency/weight). Moreover, the above-presented concept is known from DE 10 2020 113 192 B4.

The present disclosure, then, is based inter alia on the idea of designing the housing halves according to a "shaft-in-shaft" concept using the coaxiality of the transmission stages. In this case, the shaft of one housing half is mounted via needle bearings in the shaft of the second housing half. Consequently, bearing points can be dispensed with. The needle bearings used merely have to compensate for the differential rotational speed on the right/left and thus have very low bearing losses. In the case of straight-ahead travel (no differential rotational speed), the losses in the needle bearing even disappear completely. Optionally, it is moreover possible, by way of corresponding formation of the toothing, for axial force compensation to be provided by a radial/axial bearing as a main bearing. This results in a reduction in the bearing forces and thus in greater efficiency and a longer bearing service life. Through the omission of bearing points, it is moreover possible for a weight advantage to be achieved. The housing halves may moreover be arranged more compactly since the separate rolling bearing arrangement of the stages is omitted.

The transmission according to the disclosure makes possible a further great saving in terms of installation space in the vehicle transverse direction in that the required widths for the shaft bearing arrangements and the toothed gearwheels meshing with one another are skillfully arranged, in the present case in particular in a radially nested manner, such that, in a single axial region, both meshing of a toothed-gearwheel pairing and arrangement of a rolling bearing are realized.

According to one embodiment, the main bearing is arranged in an axially and radially extending cutout, in particular of a radial support, of an intermediate-shaft toothed gearwheel of the first spur-gear-toothing stage. Consequently, the transmission can be arranged in a greatly reduced installation space.

According to one embodiment, the two coaxial drive shafts and/or the two coaxial intermediate shafts and/or the two coaxial output shafts are configured so as to be mounted axially overlapping and one in the other, in particular by means of at least one needle bearing. Despite the axially limited installation space and the formation of the transmission without a central radial bearing, the coaxial shafts can be consequently mounted in an operationally reliable manner, in the present case so as to be radially supported against one another.

According to one embodiment, the two first spur-gear-toothing stages and/or the two second spur-gear-toothing stages are configured in an oppositely helical manner. This makes it possible to compensate for oppositely acting axial forces as far as complete mutual elimination of such axial forces.

According to one embodiment, an intermediate-shaft bearing part of the main bearing is fixed in a rotationally conjoint manner to an intermediate-shaft outer lateral surface of the intermediate shaft.

According to an alternative embodiment, an intermediate-shaft bearing part of the main bearing is fixed in a rotationally conjoint manner to a toothed-ring inner lateral surface of the intermediate-shaft toothed ring of the first spur-gear-toothing stage. As a result of the arrangement, situated radially further to the outside, of the bearing, the latter may be formed to be circumferentially longer, which makes possible a narrower embodiment of the bearing and thus a further saving in terms of installation space in the vehicle transverse direction.

According to one embodiment, the main bearing constitutes an end of an intermediate-shaft assembly that is remote from the center of the transmission, or is at least arranged in the region of its end remote from the center of the transmission. This ensures that a minimum axial installation space is able to be realized.

According to one embodiment, an intermediate-shaft assembly—which has at least the two intermediate shafts, the intermediate-shaft bearing parts and also an intermediate-shaft toothed gearwheel of the first spur-gear-toothing stage and an intermediate-shaft toothed gearwheel of the second spur-gear-toothing stage—has an axial width which is at least a summed width of the four toothed-gearwheel stages and an additional extent, which is smaller than the summed width of the four toothed-gearwheel stages and the two main bearings. As a result of the associated saving in terms of installation space in the axial direction, it is possible for example for a more complex and thus better wheel suspension and/or improved wheel kinematics to be installed.

According to one embodiment, the axial width of the intermediate-shaft assembly exceeds the summed width of the four toothed-gearwheel stages by less than two thirds, in particular less than half or one quarter, of the summed width of the two main bearings. Without implementation of the disclosure, it would not be possible to design a generic transmission of such narrowness axially, that is to say, in the vehicle transverse direction.

Further advantages and possible uses of the disclosure emerge from the following description in conjunction with the figures:

DETAILED DESCRIPTION OF THE DRAWINGS

Figure 1:
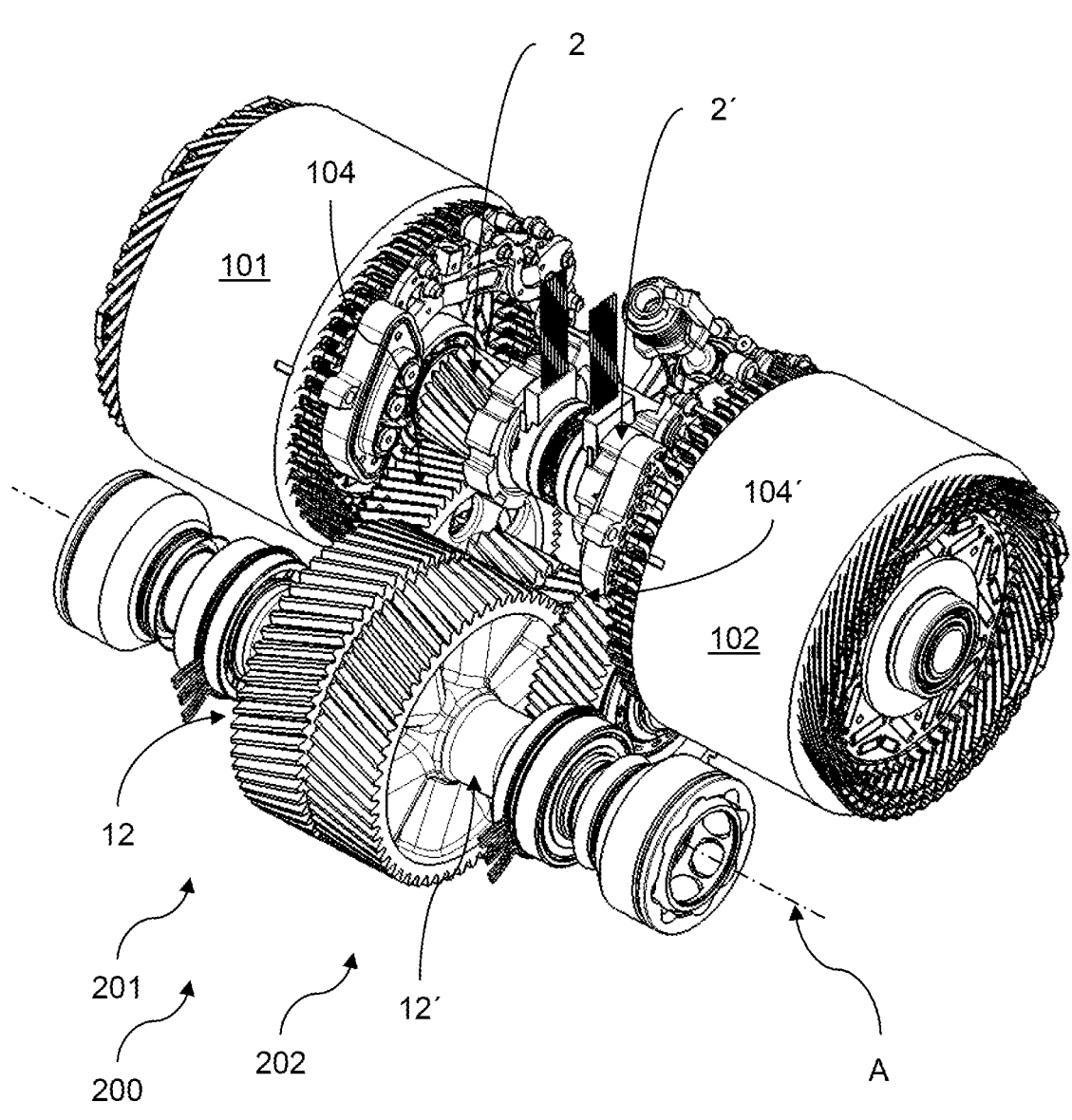
FIG. 1 shows a T-arrangement with a transmission according to an exemplary embodiment of the disclosure in an oblique view.

FIG. 1 shows a T-arrangement with two coaxial electric drive machines 101 and 102 and with a transmission 200 according to an exemplary embodiment of the disclosure in an oblique view.

Figure 2:
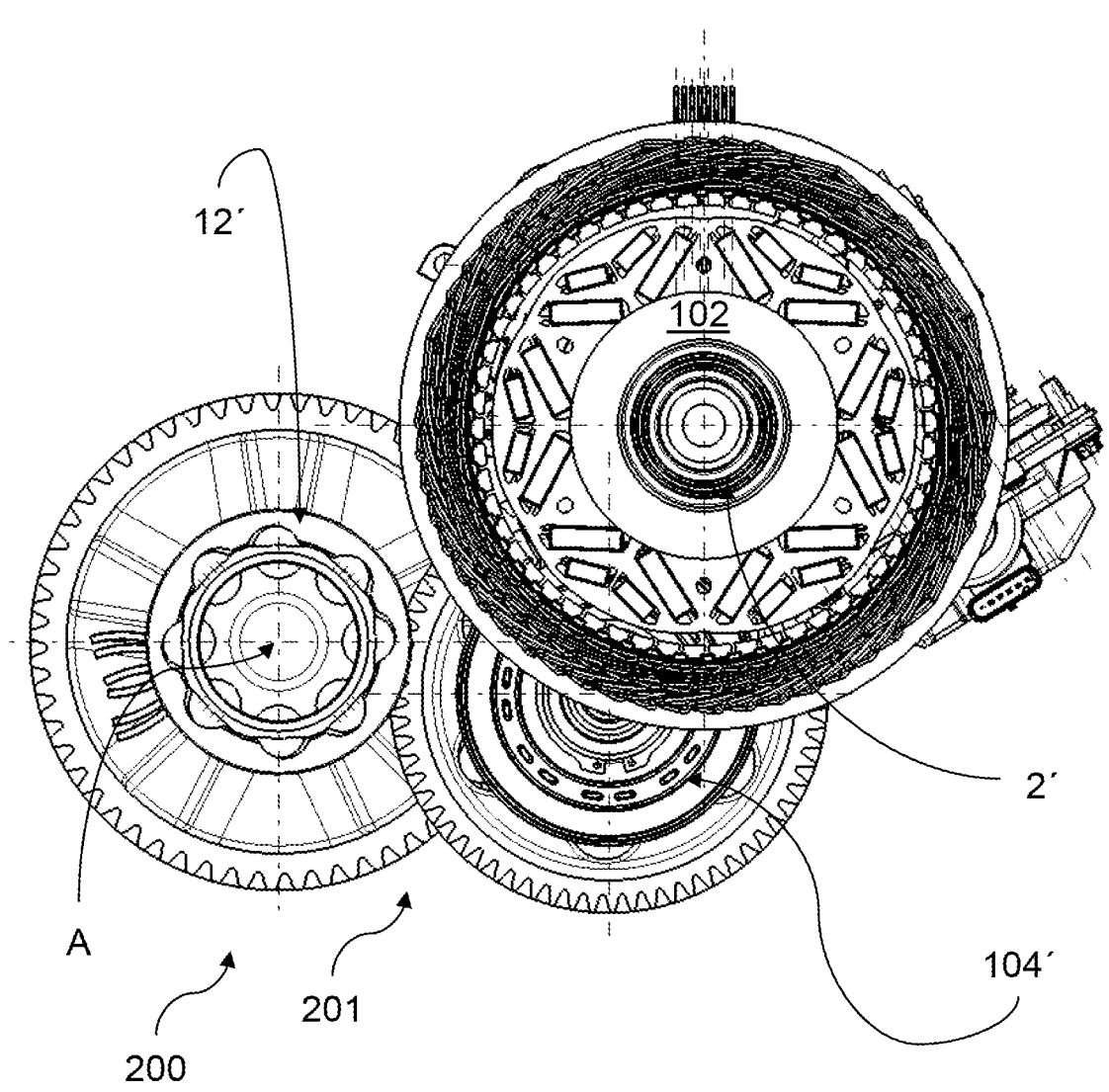
FIG. 2 shows the T-arrangement from FIG. 1 in a side view.
Figure 3:
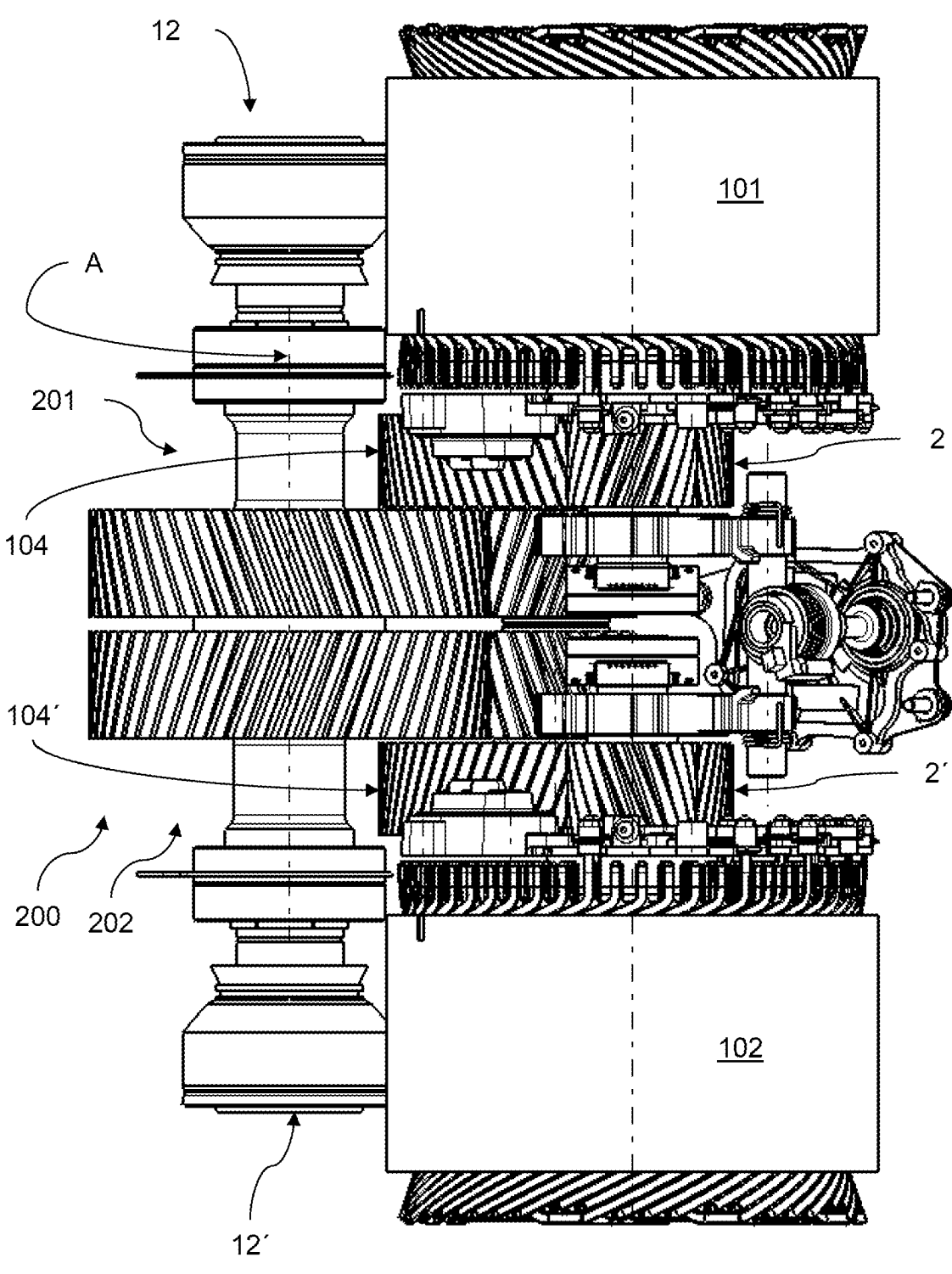
FIG. 3 shows the T-arrangement from FIG. 1 in a plan view.

FIG. 2 shows the T-arrangement from FIG. 1 in a side view, and FIG. 3 shows it in a plan view.

The transmission 200 has a first sub-transmission 201 with the rotor shaft 2 of the first electric drive machine 101, with the intermediate shaft 104 for the first electric drive machine and with the output shaft 12 for the first electric drive machine. The transmission 200 furthermore has a second sub-transmission 202 with the rotor shaft 2' of the second electric drive machine 102, with the intermediate shaft 104' for the second electric drive machine and with the output shaft 12' for the second electric drive machine.

The transmission 200 is intended for transmitting torque from the two coaxially arranged electric drive machines 101 and 102 to two wheels (not illustrated) of a drive axle A of a motor vehicle, wherein each of the drive machines is connected to a different one of the wheels of the drive axle by means of a different speed-reduction sub-transmission 201 or 202 for transmitting torque, and wherein the sub-transmissions 201 and 202 have coaxial rotor/drive shafts 2 and 2', coaxial intermediate shafts 104 and 104' and coaxial outputs shafts 12 and 12'.

In relation to an axial direction of an axis of rotation of the rotor shafts 2 and 2' of the two electric drive machines 101 and 102, on both sub-transmissions 201 and 202, a first spur-gear-toothing stage 3/4 (toothed gearwheels 3 and 4 mesh with one another) of the drive shaft 2 with the intermediate shaft 104 is arranged closer to the assigned electric drive machine 101 than a second spur-gear-toothing stage 8/14 (toothed gearwheels 8 and 14 mesh with one another) of the intermediate shaft 104 with the output shaft 12. A closer axial proximity of the first spur-gear-toothing stage 3'/4' to the assigned second electric drive machine 102 than to the second spur-gear-toothing stage 8'/14' also applies.

With the present speed-reduction transmission, this means that the larger toothed gearwheel 4 or 4' of the first spur-gear-toothing stage 3/4 or 3'/4' is arranged on the intermediate shaft 104 or 104' in each case axially at the outside. This in turn makes possible, in particular in the case of an axially externally recessed toothed-gearwheel rim, an arrangement of a main bearing 7 or 7' of the intermediate shaft 104 or 104' radially within the toothed ring and axially in the region of the toothed ring. Consequently, in comparison with known solutions, the installation space requirement for the main bearings 7 and 7' of the intermediate shafts 104 and 104' is obviated.

Figure 4:
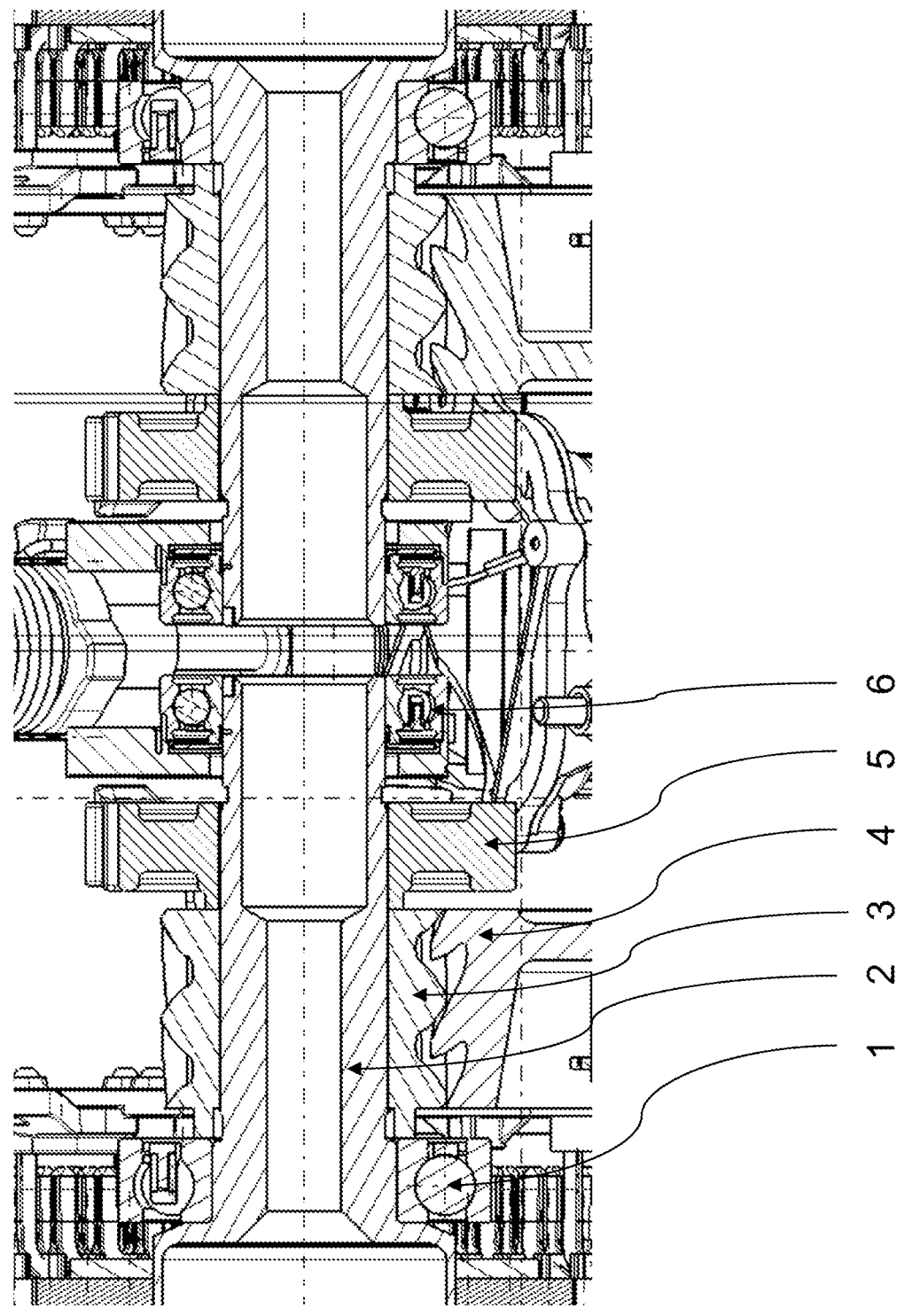
FIG. 4 shows a first detail of the transmission from FIG. 1 in a sectional view through the rotor shafts of the electric drive machines.
Figure 5:
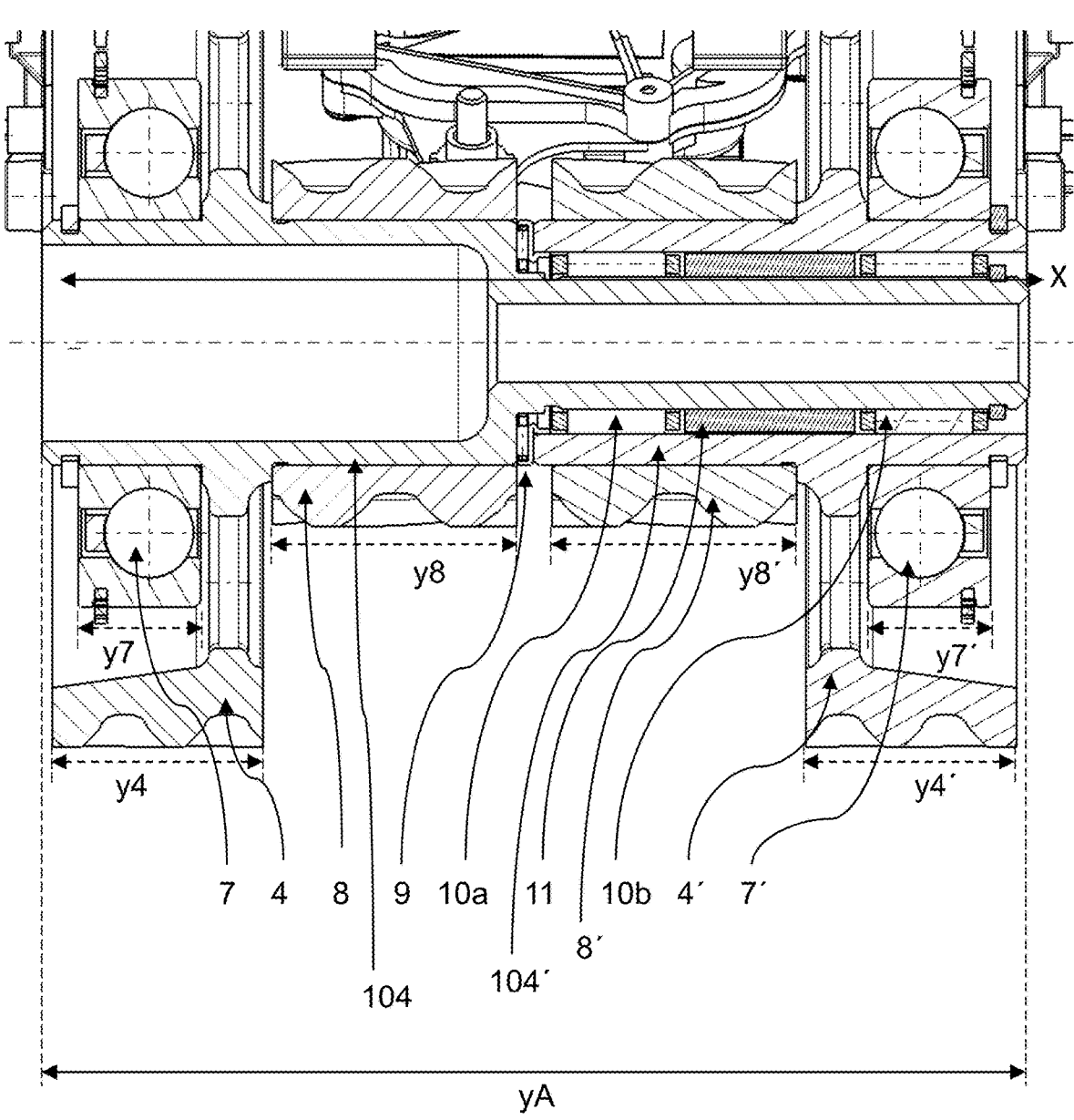
FIG. 5 shows a second detail of the transmission from FIG. 1 in a sectional view through the intermediate shafts of the transmission.
Figure 7:
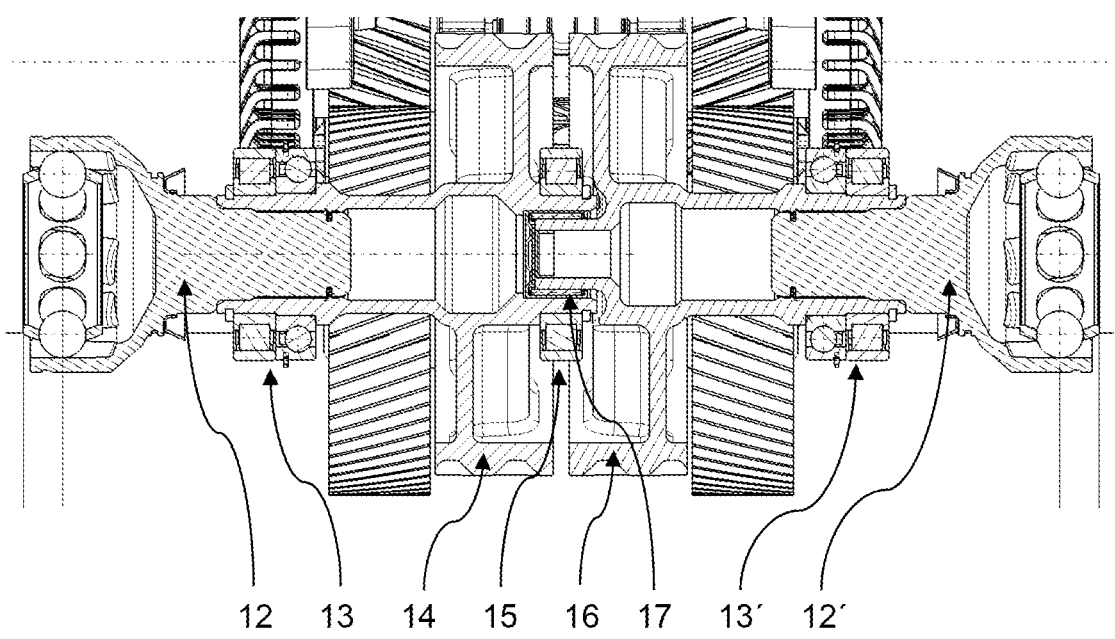
FIG. 7 shows a third detail of the transmission from FIG. 1 in a sectional view through the output shafts of the transmission.

The arrangement of the different toothed-gearwheel pairings can be seen in different details of the transmission 200, in particular in FIGS. 4, 5, and 7.

FIG. 4 shows in this respect a first detail of the transmission from FIG. 1 in a sectional view through the rotor shafts of the electric drive machines.

FIG. 5 shows in this respect a second detail of the transmission from FIG. 1 in a sectional view through the intermediate shafts of the transmission.

FIG. 7 shows in this respect a third detail of the transmission from FIG. 1 in a sectional view through the output shafts of the transmission.

In relation to the transmission 200 as a whole, an axial installation space requirement for two main bearings is thus obviated if implementation of the disclosure is realized at both intermediate shafts 104 and 104' as in the present case. In this way, a significantly greater amount of available installation space for the drive kinematics and the wheels remains.

In the present case, the main bearings 7 and 7' are each arranged in an axially and radially extending cutout of the intermediate-shaft toothed gearwheel 4 or 4' of the first spur-gear-toothing stage 3/4 or 3'/4'. Consequently, the transmission can be arranged in a greatly reduced installation space.

In the present case, the two coaxial intermediate shafts 104 and 104' and the two coaxial output shafts 12 and 12' are mounted axially overlapping and one in the other, in each case by means of needle bearings 10a and 10b or 17. Despite the axially limited installation space and the formation of the transmission without a central radial bearing, the coaxial shafts can be consequently mounted in an operationally reliable manner, in the present case so as to be radially supported against one another.

The two first spur-gear-toothing stages 3/4 and 3'/4' and the two second spur-gear-toothing stages 8/14 and 8'/14' are configured in an oppositely helical manner. This makes it possible to compensate for oppositely acting axial forces as far as complete mutual elimination of such axial forces.

In the exemplary embodiment described here (FIGS. 1-5 and 7), an intermediate-shaft bearing part of the main bearing is fixed in a rotationally conjoint manner to an intermediate-shaft outer lateral surface of the intermediate shaft.

In the present case, the main bearing constitutes an end of an intermediate-shaft assembly that is remote from the center of the transmission, or is at least arranged in the region of its end remote from the center of the transmission. This ensures that a minimum axial installation space is able to be realized.

In the present case, an intermediate-shaft assembly—which has the two intermediate shafts, the intermediate-shaft bearing parts and also an intermediate-shaft toothed gearwheel of the first spur-gear-toothing stage and an intermediate-shaft toothed gearwheel of the second spur-gear-toothing stage—has an axial width yA which is a summed width $y4+y8+y8'+y4'$ of the four toothed-gearwheel stages plus an additional extent which is smaller than the summed width of the four toothed-gearwheel stages and the two main bearings. As a result of the associated saving in terms of installation space in the axial direction, it is possible for example for a more complex and thus better wheel suspension and/or improved wheel kinematics to be installed.

In the present case, the axial width yA of the intermediate-shaft assembly exceeds the summed width $y4+y8+y8'+y4'$ of the four toothed-gearwheel stages by less than a quarter of the summed width of the two main bearings 7 and 7'. Without implantation of the disclosure, it would not be possible to design a generic transmission of such narrowness axially, that is to say, in the vehicle transverse direction X.

Figure 6:
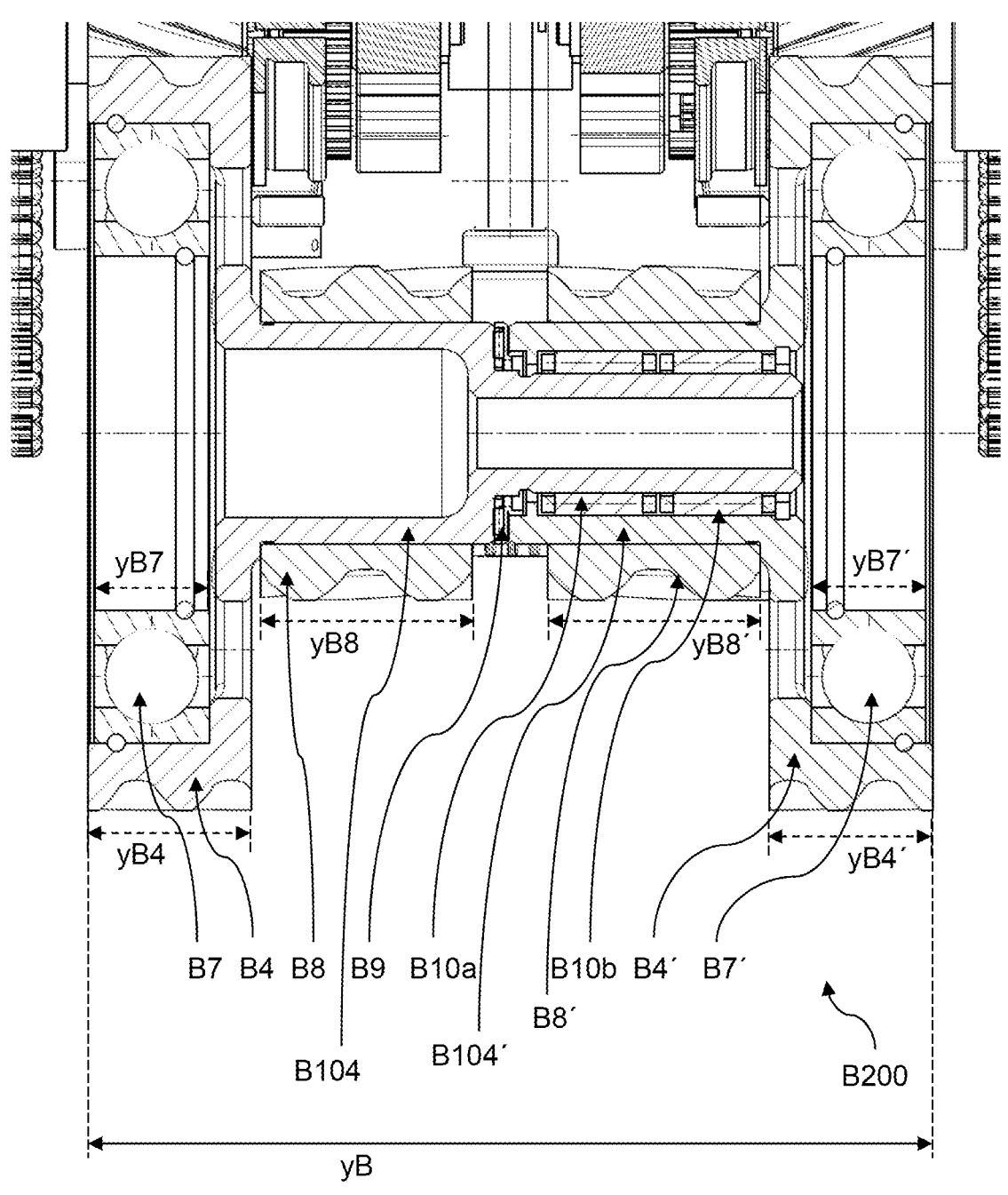
FIG. 6 shows a detail of a transmission according to another exemplary embodiment of the disclosure that corresponds to the second detail in FIG. 5, that is to say in a sectional view through the intermediate shafts of the alternative transmission.

FIG. 6 shows a detail of a transmission according to another exemplary embodiment of the disclosure that corresponds to the second detail in FIG. 5, that is to say, in a sectional view through the intermediate shafts of the alternative transmission.

In an alternative embodiment according to FIG. 6, an intermediate-shaft bearing part of the main bearing is fixed in a rotationally conjoint manner to a toothed-ring inner lateral surface of the intermediate-shaft toothed ring of the first spur-gear-toothing stage. As a result of the arrangement, situated radially further to the outside, of the bearing, the latter may be formed to be circumferentially longer, which makes possible a narrower embodiment of the bearing and thus a further saving in terms of installation space in the vehicle transverse direction.

The foregoing disclosure has been set forth merely to illustrate the preferred embodiments and is not intended to be limiting. Since modifications of the disclosed embodiments incorporating the spirit and substance of the disclosure may occur to persons skilled in the art, the disclosure and inventions should be construed to at least include everything within the scope of the appended claims and equivalents thereof.

LIST OF REFERENCE SIGNS (Drive)
101 First electric drive machine
102 Second electric drive machine
200 Transmission
A Drive axle
(Rotor Shafts, etc.)
1 A-bearing of the first electric drive machine
2 Rotor shaft of the first electric drive machine
2' Rotor shaft of the second electric drive machine
3 Toothed gearwheel of the rotor shaft of the first electric drive machine
5 Parking-lock wheel of the first electric drive machine
6 Central radial housing bearing of the rotor shaft of the first electric drive machine
(Intermediate Shafts, Etc.—Variant A)
4 Outer toothed gearwheel of the intermediate shaft for the first electric drive machine, in the present case formed as one part with the first intermediate shaft
104 Intermediate shaft for the first electric drive machine
4 Outer toothed gearwheel of the intermediate shaft for the second electric drive machine, in the present case formed as one part with the second intermediate shaft
104' Intermediate shaft for the second electric drive machine
7 Main bearing of the intermediate shaft 104
7' Main bearing of the intermediate shaft 104'
8 Inner toothed gearwheel of the intermediate shaft for the first electric drive machine
8' Inner toothed gearwheel of the intermediate shaft for the second electric drive machine
9 Axial bearing between the intermediate shafts 104 and 104'
10 Radial needle bearing between the intermediate shafts 104 and 104'
11 Spacer sleeve between the needle bearings 10a and 10b
(Intermediate Shafts, Etc.—Variant B)
B4 Outer toothed gearwheel of the intermediate shaft for the first electric drive machine, in the present case formed as one part with the first intermediate shaft
B104 Intermediate shaft for the first electric drive machine
B4' Outer toothed gearwheel of the intermediate shaft for the second electric drive machine, in the present case formed as one part with the second intermediate shaft
B104' Intermediate shaft for the second electric drive machine
B7 Main bearing of the intermediate shaft B104
B7' Main bearing of the intermediate shaft B104'
B8 Inner toothed gearwheel of the intermediate shaft for the first electric drive machine
B9 Axial bearing between the intermediate shafts B104 and B104'
B10 Radial needle bearing between the intermediate shafts B104 and B104'
B200 Alternative transmission
(Output Shafts, Etc.)
12 Output shaft for the first electric drive machine
12' Output shaft for the second electric drive machine
13 Main bearing arrangement of the toothed gear 12
13' Main bearing arrangement of the toothed gear 12'
14 Toothed gearwheel of the output shaft 12
15 Central radial housing bearing of the toothed gearwheel 14

16 Toothed gearwheel of the output shaft 12'
17 Radial needle bearing between the toothed gearwheels 14 and 16
What is claimed is:
1. A transmission for transmitting torque from two coaxially arranged electric drive machines to two wheels of a drive axle of a motor vehicle, wherein:
each of the drive machines is connected to a wheel of the drive axle via a speed-reduction sub-transmission for transmitting torque,
the sub-transmissions have coaxial drive shafts, coaxial intermediate shafts and coaxial outputs shafts, and
on both sub-transmissions, a first spur-gear-toothing stage of the drive shaft with the intermediate shaft is arranged, in relation to an axial direction, closer to the assigned electric drive machine than a second spur-gear-toothing stage of the intermediate shaft with the output shaft,
wherein each intermediate shaft comprises a main axial rolling bearing configured to be arranged radially within and axially in the region of a toothed ring of an intermediate-shaft toothed gearwheel of the first spur-gear-toothing stage, the main bearing being received in an axially and radially extending cutout of the toothed ring and being fixed in a rotationally conjoint manner to a toothed-ring inner lateral surface,
wherein the two coaxial intermediate shafts are mounted axially overlapping and one in the other by at least one needle bearing and the transmission is formed without a central radial bearing for the intermediate shafts, and
wherein the two first spur-gear-toothing stages and the two second spur-gear-toothing stages are configured in an oppositely helical manner.
2. The transmission according to claim 1, wherein:
the two coaxial drive shafts and/or the two coaxial intermediate shafts and/or the two coaxial output shafts are configured so as to be mounted axially overlapping and one in the other.
3. The transmission according to claim 2, wherein:
the two coaxial drive shafts and/or the two coaxial intermediate shafts and/or the two coaxial output shafts are configured so as to be mounted axially overlapping and one in the other via at least one needle bearing.
4. The transmission according to claim 1, wherein:
an intermediate-shaft bearing part of the main bearing is fixed in a rotationally conjoint manner to an intermediate-shaft outer lateral surface of the intermediate shaft.
5. The transmission according to claim 1, wherein:
an intermediate-shaft bearing part of the main bearing is fixed in a rotationally conjoint manner to a toothed-ring inner lateral surface of an intermediate-shaft toothed ring of the first spur-gear-toothing stage.
6. The transmission according to claim 1, wherein:
the main bearing constitutes an end of an intermediate-shaft assembly that is remote from a center of the transmission.
7. The transmission according to claim 1, wherein:
the main bearing constitutes an end of an intermediate-shaft assembly that is arranged in the region of its end remote from a center of the transmission.
8. The transmission according to claim 1, wherein:
the first spur-gear-toothing stage and the second spur-gear-toothing stage of the sub-transmissions total four toothed-gearwheel stages, and
an intermediate-shaft assembly has an axial width which is smaller than a summed width of the four toothed-gearwheel stages and the two main bearings.

9. The transmission according to claim 8, wherein:

the axial width of the intermediate-shaft assembly exceeds the summed width of the four toothed-gearwheel stages by less than two thirds of a summed width of the two main bearings.

10. The transmission according to claim 8, wherein:

the axial width of the intermediate-shaft assembly exceeds the summed width of the four toothed-gearwheel stages by less than half of a summed width of the two main bearings.

11. The transmission according to claim 8, wherein:

the axial width of the intermediate-shaft assembly exceeds a summed width of the four toothed-gearwheel stages by less than one quarter of the summed width of the two main bearings.

\* \* \* \* \*